(12) United States Patent
Casey et al.

(10) Patent No.: US 10,008,973 B1
(45) Date of Patent: Jun. 26, 2018

(54) VOLTAGE CONVERSION FOR AN AIRBORNE WIND TURBINE

(71) Applicant: X Development LLC, Mountain View, CA (US)

(72) Inventors: Leo Casey, San Francisco, CA (US); Geoffrey Dolan, San Francisco, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 39 days.

(21) Appl. No.: 14/985,808

(22) Filed: Dec. 31, 2015

(51) Int. Cl.
*H02P 29/02* (2016.01)
*F03D 9/00* (2016.01)
*F03D 11/00* (2006.01)
*H02P 27/06* (2006.01)

(52) U.S. Cl.
CPC ............ *H02P 29/022* (2013.01); *F03D 9/003* (2013.01); *F03D 11/0091* (2013.01); *H02P 27/06* (2013.01)

(58) Field of Classification Search
CPC ........ H02P 29/022; H02P 27/06; F03D 9/003; F03D 11/0091
USPC ........................................................... 290/44
See application file for complete search history.

(56) References Cited

U.S. PATENT DOCUMENTS

| 8,109,711 | B2 | 2/2012 | Blumer et al. |
| 9,109,575 | B2 | 8/2015 | Weddendorf et al. |
| 2009/0009920 | A1* | 1/2009 | Yamada ................. B60L 3/0023 361/93.1 |
| 2011/0127775 | A1* | 6/2011 | Bevirt .................... B64C 39/022 290/55 |
| 2015/0180379 | A1* | 6/2015 | Goessling ............... H02P 5/685 290/55 |
| 2016/0072388 | A1* | 3/2016 | Dubus ................. H02M 3/1584 363/25 |
| 2017/0012569 | A1* | 1/2017 | Koseki .................... H02P 25/22 |

FOREIGN PATENT DOCUMENTS

| WO | WO 2014/174171 | * 10/2014 | ........... H02M 3/1584 |
| WO | WO 2015/125541 | * 8/2015 | .............. H02P 29/40 |

* cited by examiner

Primary Examiner — Viet Nguyen
Assistant Examiner — Joseph Ortega
(74) Attorney, Agent, or Firm — McDonnell Boehnen Hulbert & Berghoff LLP

(57) ABSTRACT

This disclosure discusses systems and methods related to the following example scenarios. When an aerial vehicle of an airborne wind turbine is functioning normally in motoring mode, a voltage converter may receive a nominal voltage from a power conversion system and provide the nominal voltage to the aerial vehicle. When the aerial vehicle is experiencing a fault in motoring mode, the voltage converter may receive the nominal voltage and provide a reduced fault voltage to the aerial vehicle. When the aerial vehicle is functioning normally in power-generating mode, the voltage converter may receive the nominal voltage from the aerial vehicle and provide the nominal voltage to the power conversion system. When the aerial vehicle is experiencing a fault in power-generating mode, the voltage converter may receive a reduced fault voltage from the aerial vehicle, boost the fault voltage, and provide the boosted fault voltage to the power conversion system.

17 Claims, 9 Drawing Sheets

VOLTAGE CONVERSION FOR AN AIRBORNE WIND TURBINE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

An aerial vehicle of an airborne wind turbine may generate DC electric power and provide such electric power to an AC power grid via an AC/DC power conversion system. The power grid may then transmit and/or distribute the power to remote locations. In some instances, the power grid may provide power to the aerial vehicle so that the aerial vehicle can maneuver to a position and altitude suitable to begin generating power. In some examples, multiple aerial vehicles may be connected to the power conversion system. The power conversion system may independently provide power to, or receive power from, the respective aerial vehicles. At times, one or more of the aerial vehicles may experience a fault. In some implementations, to accommodate the faulted aerial vehicle the power conversion system may reduce the voltage provided to all aerial vehicles connected to the power conversion system or may disconnect the faulted aerial vehicle from the power conversion system. Neither of these alternatives are exceedingly efficient. This disclosure discusses systems and methods for accommodating a faulted aerial vehicle while simultaneously facilitating normal operation of aerial vehicles that are not experiencing faults, so as to increase efficiency.

In one example, a method includes receiving, at a voltage converter, a nominal voltage and providing, from the voltage converter, the nominal voltage to a plurality of motor/generators of an aerial vehicle of an airborne wind turbine. The plurality of motor/generators may be electrically connected in series with a voltage drop across each individual motor/generator corresponding to a portion of the nominal voltage. The method further includes, while providing the nominal voltage, detecting a fault that occurs on a given motor/generator of the plurality. The fault may cause the voltage drop across each of the respective motor/generators other than the given motor/generator to increase. The method further includes, in response to detecting the fault, providing, via the voltage converter, a fault voltage to the plurality of motor/generators. The fault voltage may have a magnitude that is less than a magnitude of the nominal voltage, thereby decreasing the voltage drops across each of the respective motor/generators other than the given motor/generator.

In another example, a method includes receiving, at a voltage converter, a nominal voltage from a plurality of motor/generators of an aerial vehicle of an airborne wind turbine. The nominal voltage may represent a sum of voltage drops across each respective motor/generator of the plurality. The method further includes providing, from the voltage converter, the nominal voltage to a power conversion system and while providing the nominal voltage, detecting a fault that occurs on a given motor/generator of the plurality. The fault may cause the sum of voltage drops of each of the motor/generators to decrease to a fault voltage. The method further includes, in response to detecting the fault, boosting the fault voltage and providing the boosted fault voltage to the power conversion system.

In yet another example, an airborne wind turbine (AWT) includes a voltage converter and a tether. The voltage converter may electrically connect a power conversion system to the tether. The AWT further includes an aerial vehicle. The tether may electrically connect the aerial vehicle to the voltage converter and the voltage converter may be configured to operate in a first mode or a second mode. In the first mode, the voltage converter may receive a nominal voltage from the power conversion system and provide the nominal voltage to the tether. In the second mode, the voltage converter may receive the nominal voltage from the power conversion system and provide a fault voltage to the tether. The fault voltage may have a magnitude that is less than a magnitude of the nominal voltage.

These as well as other aspects, advantages, and alternatives, will become apparent to those of ordinary skill in the art by reading the following detailed description, with reference where appropriate to the accompanying drawings.

DETAILED DESCRIPTION

Figure 1:
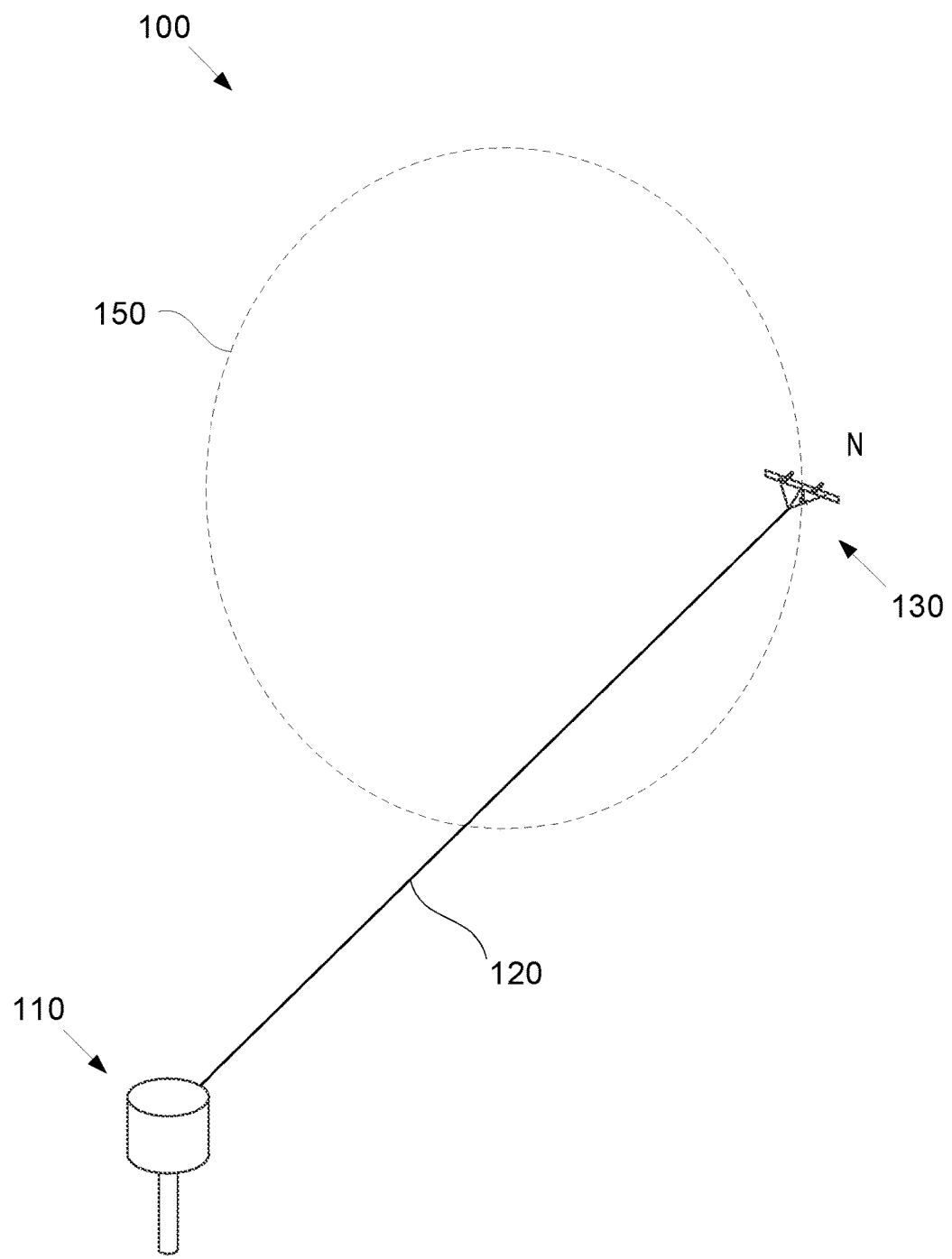
FIG. 1 depicts an airborne wind turbine (AWT), according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

A wind-based power-generation system may include an aerial vehicle connected to a power conversion system via a tether. For example, the aerial vehicle may include a wing and a plurality of dual-purpose motor/generators mounted on the wing. The motor/generators may each include a plurality of blades that can act as a propeller or a wind turbine, depending on the situation. For example, in a motoring mode, the motor/generators may operate as propellers. The power conversion system may provide electrical power to the motor/generators via a conductive portion of the tether, and the propellers may operate to maneuver the aerial vehicle to a position and altitude suitable for beginning crosswind flight.

In crosswind flight, the aerial vehicle may operate in a power-generating mode. The aerodynamic shape of the wing and/or adjustable flaps, in conjunction with the wind, may be used to maneuver the aerial vehicle along a somewhat circular or elliptical path that is substantially perpendicular to the direction of the wind. As the aerial vehicle travels the crosswind path, air resistance causes the blades of the motor/generators to spin, thereby generating electrical current that travels down the tether to the power conversion system.

In some instances, the power generation system may include multiple aerial vehicles that are all connected to a DC bus of the power conversion system. This may allow the power conversion system to independently provide current to, or receive current from, the respective aerial vehicles. For example, a first aerial vehicle may be in a power-generating mode, thereby providing current to the power conversion system, while at the same time a second aerial vehicle may be in a motoring mode in which the power conversion system provides current to the second aerial vehicle. Each aerial vehicle may include a "stack" of motor/generators (e.g., four motor/generators) that may be connected in series. Accordingly, in motoring mode, each motor/generator may be responsible for a roughly equal portion of a nominal voltage drop provided by the power conversion system. In power-generating mode, each motor/generator of the stack may generate a roughly equal portion of the nominal voltage to be provided to the power-conversion system. In some cases, an aerial vehicle may experience a fault, which may necessitate either reducing the voltage provided to the faulted aerial vehicle in motoring mode, or boosting the voltage generated by the faulted aerial vehicle in power-generating mode. In this way, the power conversion system can accommodate faulted aerial vehicles while simultaneously facilitating normal operation of other aerial vehicles that are not experiencing faults.

For example, a fault might include a motor/generator experiencing a short while the aerial vehicle is in motoring mode. Before the short occurs, the power conversion system may provide a nominal voltage (e.g., 3,400 volts DC) to the aerial vehicle. During normal operation, the nominal voltage drop may be distributed roughly equally across the stack of motor/generators (e.g., 850 volts across each motor/generator in the stack). After one of the aerial vehicle's motor/generators experiences a short, the total nominal voltage drop across the stack may remain substantially constant, which may cause each non-faulted motor/generator in the stack to see an amount of voltage that exceeds the rating of the motor/generator, possibly causing damage to the motor/generators. In this case, a voltage converter may be used to provide a "fault" voltage (e.g., 2,550 volts) to the aerial vehicle so that a suitable voltage (e.g., 850 volts) is seen across each non-faulted motor/generator.

In another example, a short may occur on a motor/generator while the aerial vehicle is in power-generating mode. This might cause the aerial vehicle to provide a reduced "fault" voltage (e.g., 2,550 volts) to the power conversion system, which may cause conversion equipment connected to the DC bus to malfunction. To alleviate this, the voltage converter may be used to boost the fault voltage provided by the aerial vehicle, so that the power conversion system receives the anticipated nominal voltage.

Such voltage converters could be implemented in various ways, but costs can be minimized by using implementations and components that are designed to withstand voltages and currents corresponding to the difference between the nominal bus voltage (e.g., 3,400) and the fault voltage (e.g., 2,550 volts), instead of implementations and components that are designed to withstand the full nominal voltage.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 depicts an airborne wind turbine (AWT) 100, according to an example embodiment. In particular, the AWT 100 includes a ground station 110, a tether 120, and an aerial vehicle 130. As shown in FIG. 1, the tether 120 may be connected to the aerial vehicle 130 at a first end and may be connected to the ground station 110 at a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, the ground station 110 may be configured for use on land. However, the ground station 110 may also be implemented on a body of water, such as a lake, river, sea, or ocean. For example, a ground station could include or be arranged on a floating offshore platform or a boat, among other possibilities. Further, the ground station 110 may be configured to remain stationary or to move relative to the ground or the surface of a body of water.

In addition, the ground station 110 may include one or more components (not shown), such as a winch, that may vary a deployed length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands on the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core of the tether 120 may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic, and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150. As shown in FIG. 1, the number of revolutions of the closed path 150 that the aerial vehicle 130 has traveled along may be represented by N.

Figure 2:
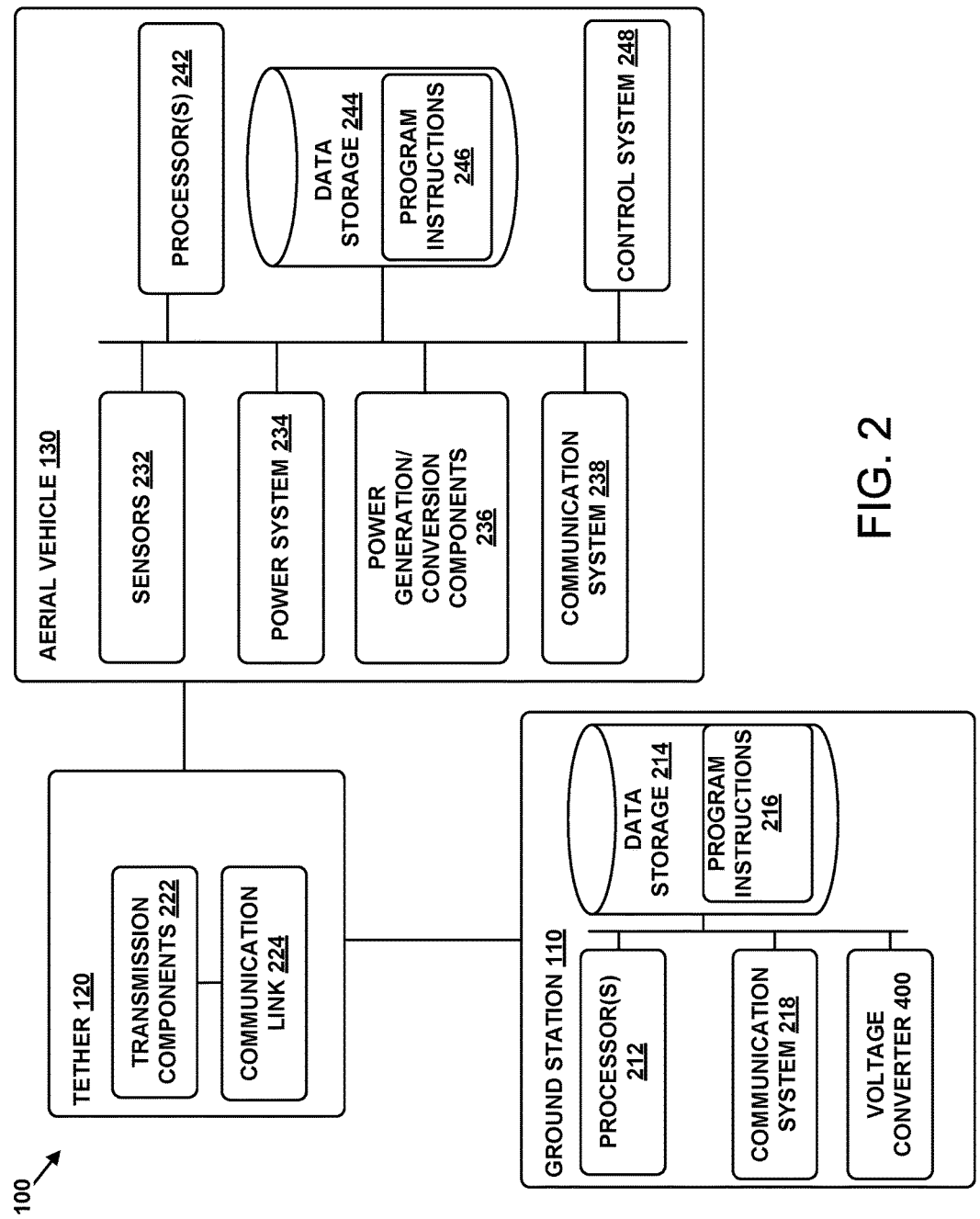
FIG. 2 is a simplified block diagram illustrating components of an AWT, according to an example embodiment.

FIG. 2 is a simplified block diagram illustrating components of the AWT 100.

As shown in FIG. 2, the ground station 110 may include one or more processors 212, data storage 214, and program instructions 216. A processor 212 may be a general-purpose processor or a special-purpose processor (e.g., a digital signal processor, an application-specific integrated circuit, etc.). The one or more processors 212 can be configured to execute computer-readable program instructions 216 that are stored in data storage 214 and are executable to provide any of the functionality described herein. In some implementations, the processor 212 may be implemented as a Boolean circuit or a combinational logic circuit.

The data storage 214 may include or take the form of one or more computer-readable storage media that may be read or accessed by at least one processor 212. The one or more computer-readable storage media can include volatile and/or non-volatile storage components, such as optical, magnetic, organic, or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 110. As such, the data storage 214 may include program instructions to perform or facilitate some or all of the functionality described herein.

In a further respect, the ground station 110 may include a communication system 218. The communication system 218 may include one or more wireless interfaces and/or one or more wireline interfaces, which allow the ground station 110 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. The ground station 110 may communicate with the aerial vehicle 130, other ground stations, and/or other entities (e.g., a command center) via the communication system 218.

In an example embodiment, the ground station 110 may include communication systems 218 that allows for both short-range communication and long-range communication. For example, the ground station 110 may be configured for short-range communications using Bluetooth and for long-range communications under a CDMA protocol. In such an embodiment, the ground station 110 may be configured to function as a "hotspot," or in other words, as a gateway or proxy between a remote support device (e.g., the tether 120, the aerial vehicle 130, and other ground stations) and one or more data networks, such as a cellular network and/or the Internet. Configured as such, the ground station 110 may facilitate data communications that the remote support device would otherwise be unable to perform by itself.

For example, the ground station 110 may provide a WiFi connection to the remote device, and serve as a proxy or gateway to a cellular service provider's data network, which the ground station 110 might connect to under an LTE or a 3G protocol, for instance. The ground station 110 could also serve as a proxy or gateway to other ground stations or a command center, which the remote device might not be able to otherwise access.

The ground station 110 may further include a voltage converter 400 that is described in detail below in the discussion related to FIGS. 4-D.

Moreover, as shown in FIG. 2, the tether 120 may include transmission components 222 and a communication link 224. The transmission components 222 may be configured to transmit electrical energy from the aerial vehicle 130 to the ground station 110 and/or transmit electrical energy from the ground station 110 to the aerial vehicle 130. The transmission components 222 may take various different forms in various different embodiments. For example, the transmission components 222 may include one or more conductors that are configured to transmit electricity. In at least one such example, the one or more conductors may include aluminum and/or any other material which allows for conduction of electric current. Moreover, in some implementations, the transmission components 222 may surround a core of the tether 120 (not shown).

The ground station 110 could communicate with the aerial vehicle 130 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 130 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNSS)), such as the GPS coordinates of the aerial vehicle 130. Such GPS data may be utilized by the AWT 100 to provide various functions described herein.

As another example, the sensors 232 may include one or more wind sensors, such as one or more pitot tubes. The one or more wind sensors may be configured to detect apparent and/or relative wind. Such wind data may be utilized by the AWT 100 to provide various functions described herein.

Still as another example, the sensors 232 may include an inertial measurement unit (IMU). The IMU may include both an accelerometer and a gyroscope, which may be used together to determine the orientation of the aerial vehicle 130. In particular, the accelerometer can measure the orientation of the aerial vehicle 130 with respect to earth, while the gyroscope measures the rate of rotation around an axis, such as a centerline of the aerial vehicle 130. IMUs are commercially available in low-cost, low-power packages. For instance, the IMU may take the form of or include a miniaturized micro-electro-mechanical system (MEMS) or a nano-electro-mechanical System (NEMS). Other types of IMUs may also be utilized. The IMU may include other sensors, in addition to accelerometers and gyroscopes, which may help to better determine the position and orientation of the aerial vehicle 130. Two examples of such sensors are magnetometers and pressure sensors. Other examples are also possible.

While an accelerometer and gyroscope may be effective at determining the orientation of the aerial vehicle 130, slight errors in measurement may compound over time and result in a more significant error. However, an example aerial vehicle 130 may be able mitigate or reduce such errors by using a magnetometer to measure direction. One example of a magnetometer is a low-power digital 3-axis magnetometer, which may be used to realize an orientation-independent electronic compass for accurate heading information. However, other types of magnetometers may be utilized as well.

The aerial vehicle 130 may also include a pressure sensor or barometer, which can be used to determine the altitude of the aerial vehicle 130. Alternatively, other sensors, such as sonic altimeters or radar altimeters, can be used to provide an indication of altitude, which may help to improve the accuracy of and/or prevent drift of the IMU. In addition, the aerial vehicle 130 may include one or more load cells configured to detect forces distributed between a connection of the tether 120 to the aerial vehicle 130.

As noted, the aerial vehicle 130 may include the power system 234. The power system 234 could take various different forms in various different embodiments. For example, the power system 234 may include one or more batteries for providing power to the aerial vehicle 130. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 130. In some implementations, the one or more motors or engines may be powered by a fuel, such as a hydrocarbon-based fuel. And in such implementations, the fuel could be stored on the aerial vehicle 130 and delivered to the one or more motors or engines via one or more fluid conduits, such as piping. In some implementations, the power system 234 may be implemented in whole or in part on the ground station 110.

As noted, the aerial vehicle 130 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 130 may include a communication system 238. The communication system 238 may take the form of or be similar in form to the communication system 218. The aerial vehicle 130 may communicate with the ground station 110, other aerial vehicles, and/or other entities (e.g., a command center) via the communication system 238.

In some implementations, the aerial vehicle 130 may be configured to function as a "hotspot," or in other words, as a gateway or proxy between a remote support device (e.g., the ground station 110, the tether 120, other aerial vehicles) and one or more data networks, such as a cellular network and/or the Internet. Configured as such, the aerial vehicle 130 may facilitate data communications that the remote support device would otherwise be unable to perform by itself.

For example, the aerial vehicle 130 may provide a WiFi connection to the remote device, and serve as a proxy or gateway to a cellular service provider's data network, which the aerial vehicle 130 might connect to under an LTE or a 3G protocol, for instance. The aerial vehicle 130 could also serve as a proxy or gateway to other aerial vehicles or a command station, which the remote device might not be able to otherwise access.

As noted, the aerial vehicle 130 may include the one or more processors 242, the program instructions 246, and the data storage 244. The one or more processors 242 can be configured to execute computer-readable program instructions 246 that are stored in the data storage 244 and are executable to provide any of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 130 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 130 and/or at least one entity remotely located from the aerial vehicle 130, such as the ground station 110. Generally, the manner in which the control system 248 is implemented may vary, depending upon the particular application.

While the aerial vehicle 130 has been described above, it should be understood that the methods and systems described herein could involve any suitable aerial vehicle that is connected to a tether, such as the tether 120.

Figure 3:
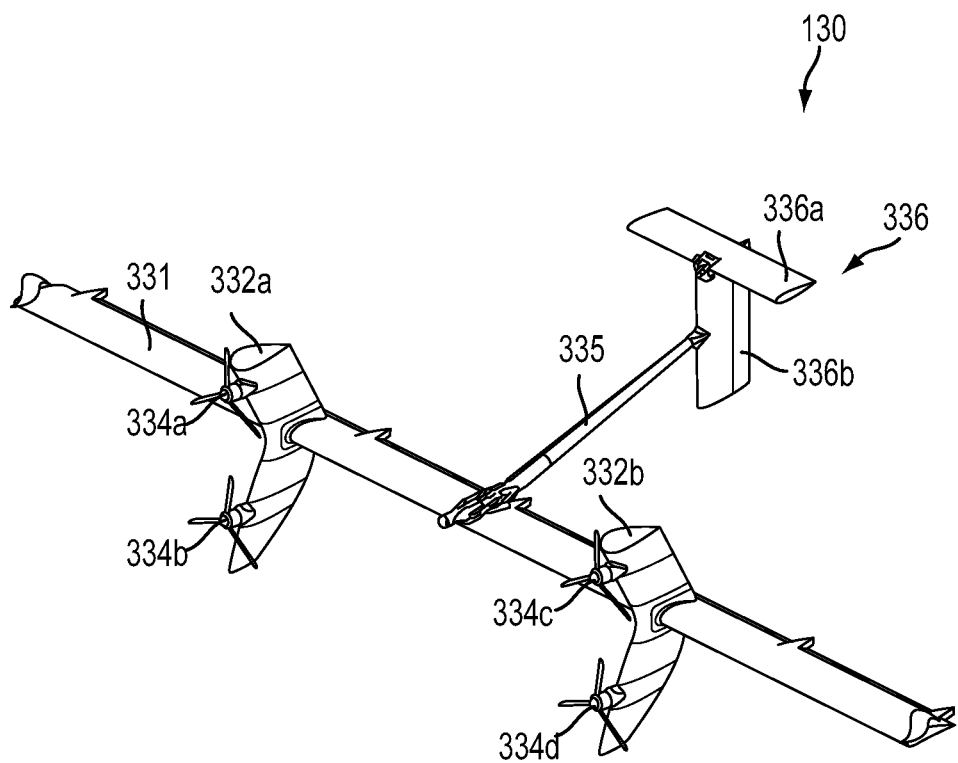
FIG. 3 depicts an aerial vehicle of an AWT, according to an example embodiment.

FIG. 3 depicts the aerial vehicle 130, according to an example embodiment. In particular, the aerial vehicle 130 may include a main wing 331, pylons 332a and 332b, rotors 334a, 334b, 334c, and 334d, a tail boom 335, and a tail wing assembly 336. Any of these components may be shaped in any form which allows for the use of components of lift to resist gravity and/or move the aerial vehicle 130 forward.

The main wing 331 may provide a primary lift force for the aerial vehicle 130. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 130 and/or reduce drag on the aerial vehicle 130 during hover flight, forward flight, and/or crosswind flight.

The main wing 331 and pylons 332a and 332b may be any suitable material for the aerial vehicle 130 to engage in hover flight, forward flight, and/or crosswind flight. For example, the main wing 331 and pylons 332a and 332b may include carbon fiber and/or e-glass, and include internal supporting spars or other structures. Moreover, the main wing 331 and pylons 332a and 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a and 332b may connect the rotors 334a, 334b, 334c, and 334d to the main wing 331. In some examples, the pylons 332a and 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust for the aerial vehicle 130 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 130 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 130. In such implementations, the tail boom 335 may carry a payload.

The tail wing 336a and/or the vertical stabilizer 336b may be used to stabilize the aerial vehicle 130 and/or reduce drag on the aerial vehicle 130 during hover flight, forward flight, and/or crosswind flight. For example, the tail wing 336a and/or the vertical stabilizer 336b may be used to maintain a pitch of the aerial vehicle 130 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 130.

While the aerial vehicle 130 has been described above, it should be understood that the systems and methods described herein could involve any suitable aerial vehicle that is connected to an airborne wind turbine tether, such as the tether 120.

Figure 4A:
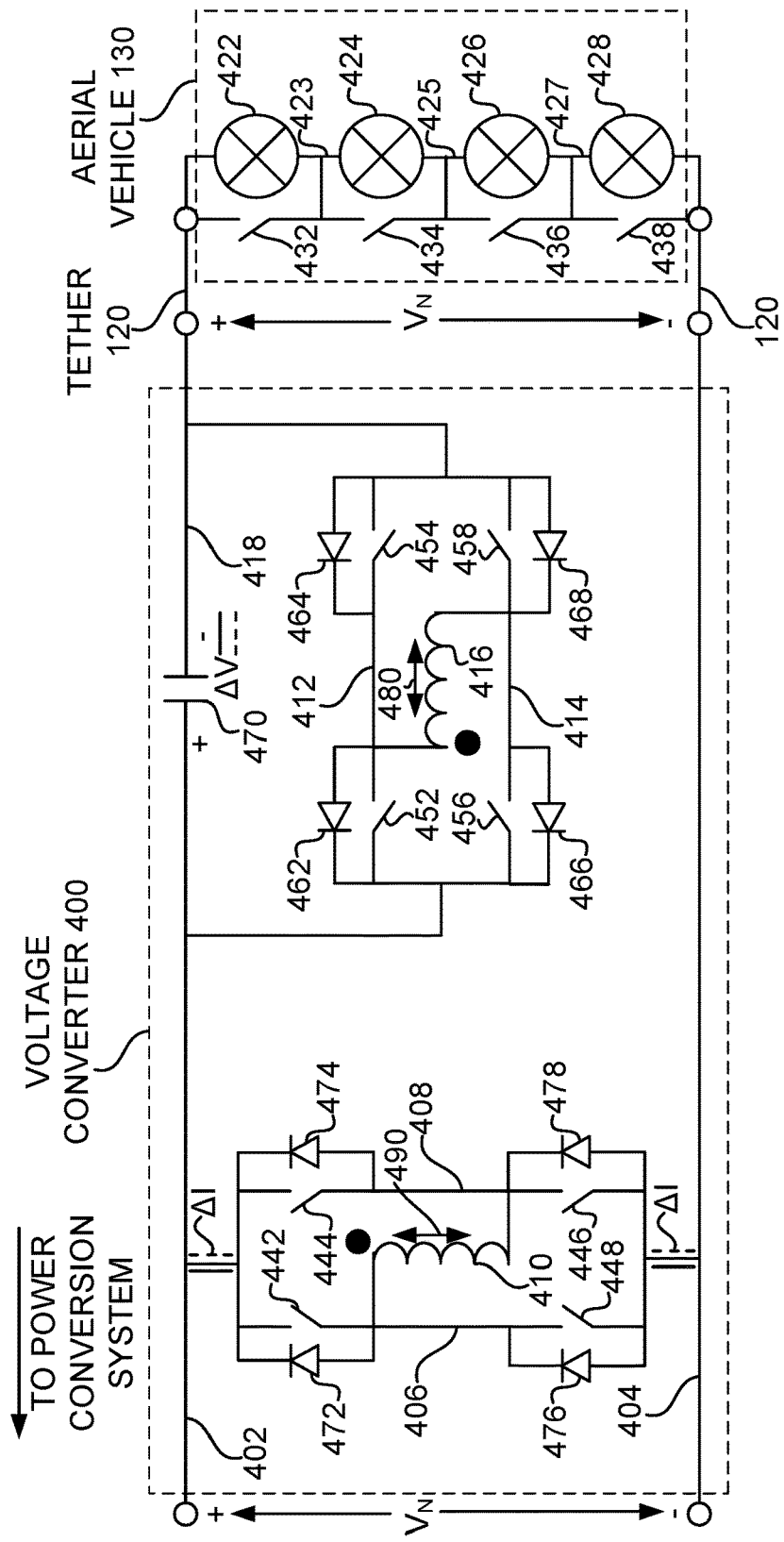
FIG. 4A depicts a voltage converter that is connected to an aerial vehicle via a tether, according to an example embodiment.

FIG. 4A depicts the voltage converter 400 as being connected to an electrical system of the aerial vehicle 130 via the tether 120, according to an example embodiment. FIGS. 4A-D are provided for illustrative purposes only and embodiments within the scope of the invention may include additional or fewer components. The aerial vehicle 130 is depicted in FIG. 4A as having a nominal voltage (e.g., 3,400 volts DC) present (i) between a positive node 402 and a negative node 404 and (ii) between a positive node 418 and the negative node 404. Functionality related to this scenario will be discussed below with regard to the methods 500 and 600 depicted respectively in FIGS. 5 and 6.

The voltage converter 400 may also include a node 406, a node 408, an inductor 410, a node 412, a node 414, an inductor 416, switches 442, 444, 446, 448, 452, 454, 456, and 458, rectifiers 472, 474, 476, 478, 462, 464, 466, and 468, and a capacitor 470. The aerial vehicle 130 may include motor/generators 422, 424, 426, and 428, terminals 423, 425, and 427, and switches 432, 434, 436, and 438.

The switches 432-458 may be controllable switches and implemented as transistors or relays, for example. Switches 432-458 may include flyback diodes or other conditioning elements that are not shown in FIG. 4A. The rectifiers 462-478 may be implemented as diodes (as shown), but other examples are possible.

The positive node 402 may be connected to the positive node 418 via the capacitor 470. The inductor 410 may be connected between the positive node 402 and the negative node 404 via the switches 442-448 and the rectifiers 472-478. The inductor 416 may be connected between the positive node 402 and the positive node 418 via the switches 452-458 and the rectifiers 462-468. The inductor 410 may be magnetically coupled to the inductor 416.

The aerial vehicle 130 may be connected to the voltage converter 400 at the positive node 418 and the negative node 404 via the tether 120. The motor/generators 422-428 may be connected in series. Switches 432-438 may act as bypass switches for the respective motor/generators 422-428.

Figure 4B:
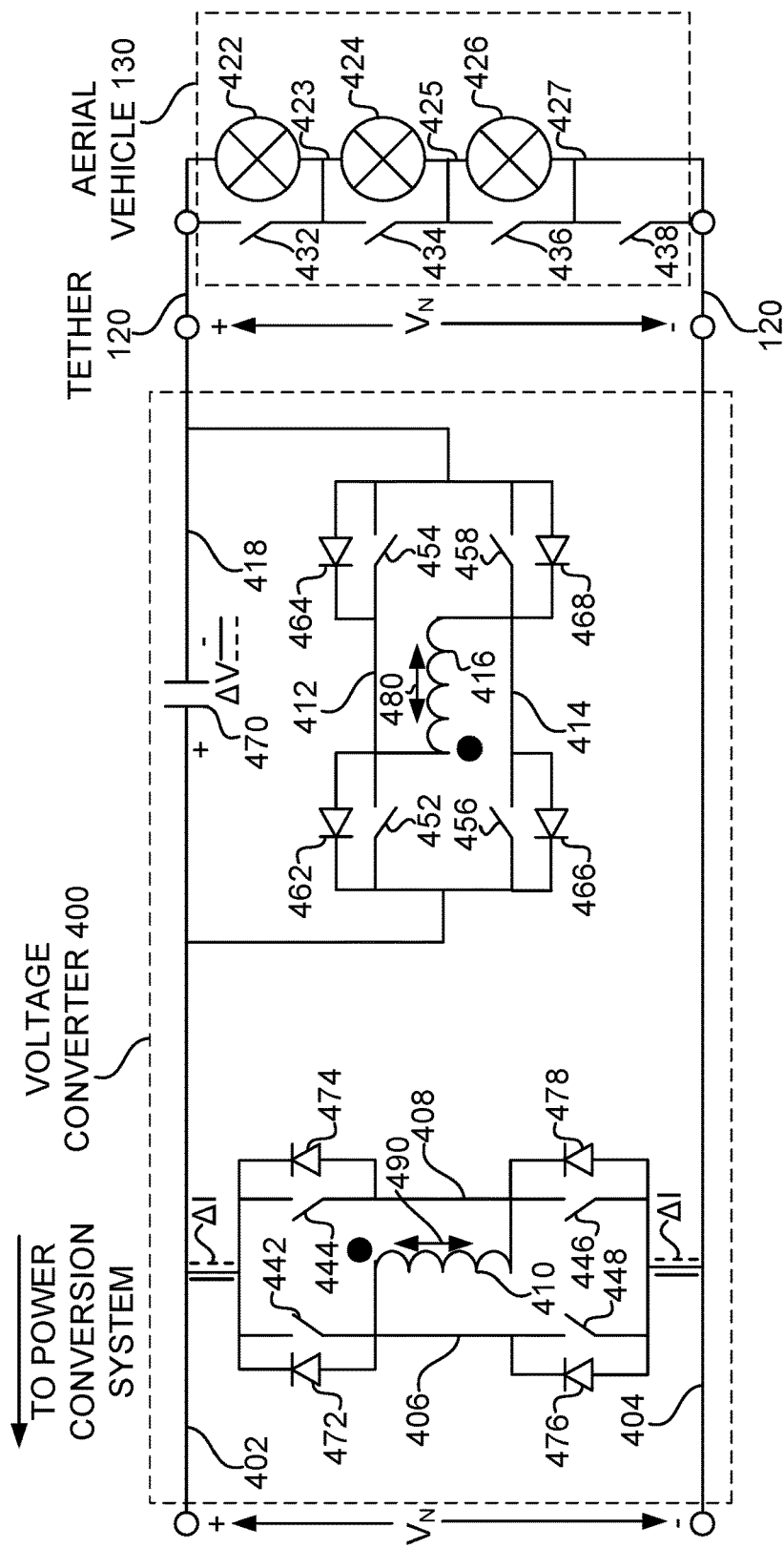
FIG. 4B depicts a voltage converter that is connected to an aerial vehicle via a tether, according to an example embodiment.

FIG. 4B also depicts the voltage converter 400 as being connected to the aerial vehicle 130 via the tether 120, according to an example embodiment. The aerial vehicle 130 is depicted in FIG. 4B as experiencing a fault on one of its motor/generators. The fault may include the motor/generator 428 experiencing a short circuit or an open circuit between the terminal 427 and the node 404. In either of these scenarios, the switch 438 may be closed to bypass the motor/generator 428 and establish an alternative current path through the aerial vehicle 130. To illustrate this condition, the motor/generator 428 has been removed from FIG. 4B and a short circuit is shown in its place between the terminal 427 and the node 404.

FIG. 4B may further depict the voltage converter 400 as having a nominal voltage (e.g., 3,400 volts DC) present (i) between the first positive node 402 and the negative node 404 and (ii) between the second positive node 418 and the negative node 404. Functionality related to this scenario will be discussed below with regard to the method 500 depicted in FIG. 5.

Figure 4C:
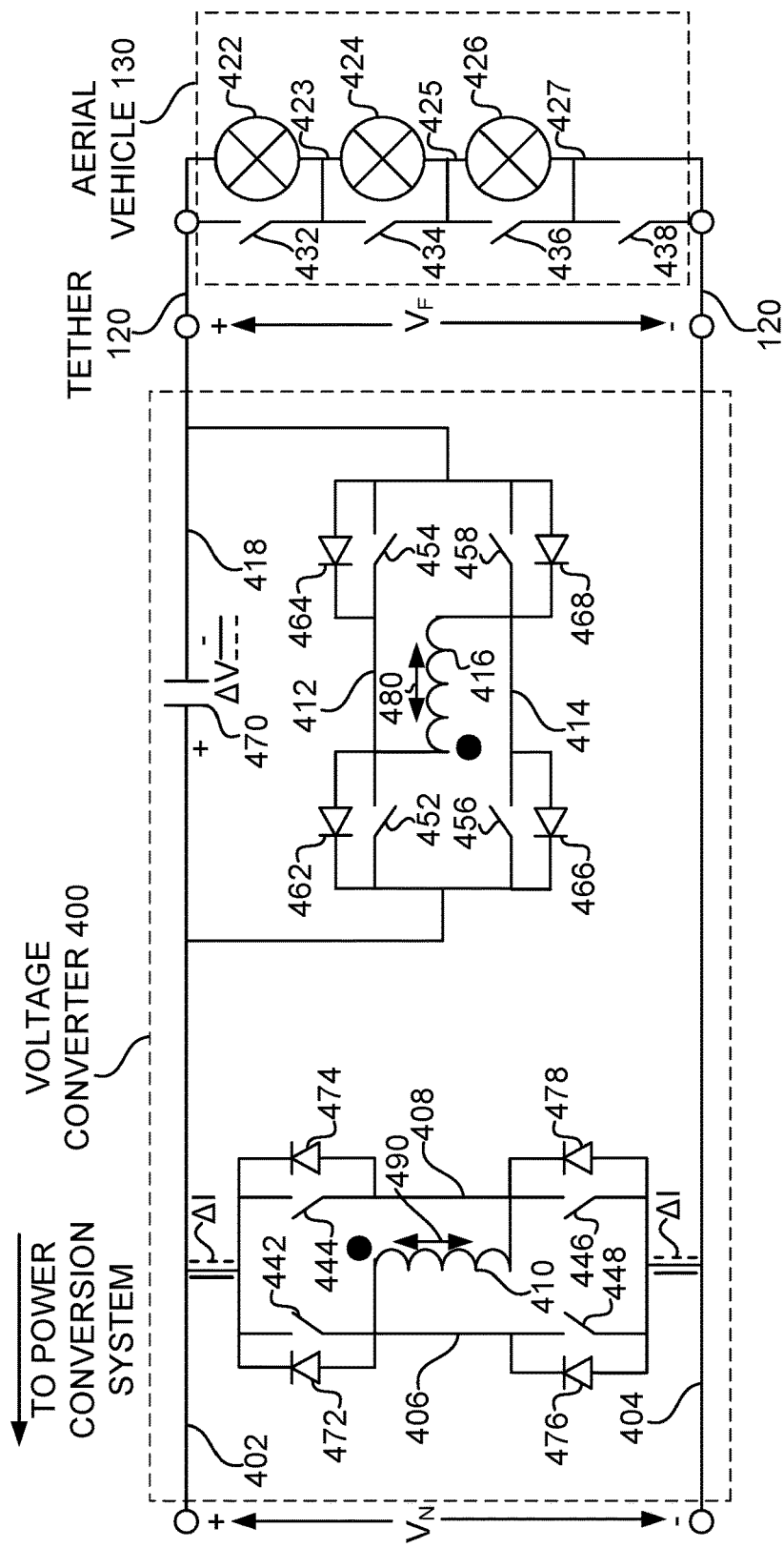
FIG. 4C depicts a voltage converter that is connected to an aerial vehicle via a tether, according to an example embodiment.

FIG. 4C also depicts the voltage converter 400 as being connected to the aerial vehicle 130 via the tether 120, according to an example embodiment. The aerial vehicle 130 is depicted in FIG. 4C as experiencing a fault on one of its motor/generators. The fault may include the motor/generator 428 experiencing a short circuit or an open circuit between the terminal 427 and the node 404. In either scenario, the switch 438 may be closed to bypass the motor/generator 428 and establish an alternative current path through the aerial vehicle 130. To illustrate this condition, the motor/generator 428 has been removed from FIG. 4C and a short circuit is shown in its place between the terminal 427 and the node 404.

FIG. 4C may further depict the voltage converter 400 as having a nominal voltage (e.g., 3,400 volts DC) present between the first positive node 402 and the negative node 404 and a fault voltage (e.g., 2,550 volts DC) present between the second positive node 418 and the negative node 404. Functionality related to this scenario will be discussed below with regard to the methods 500 and 600 depicted respectively in FIGS. 5 and 6.

Figure 4D:
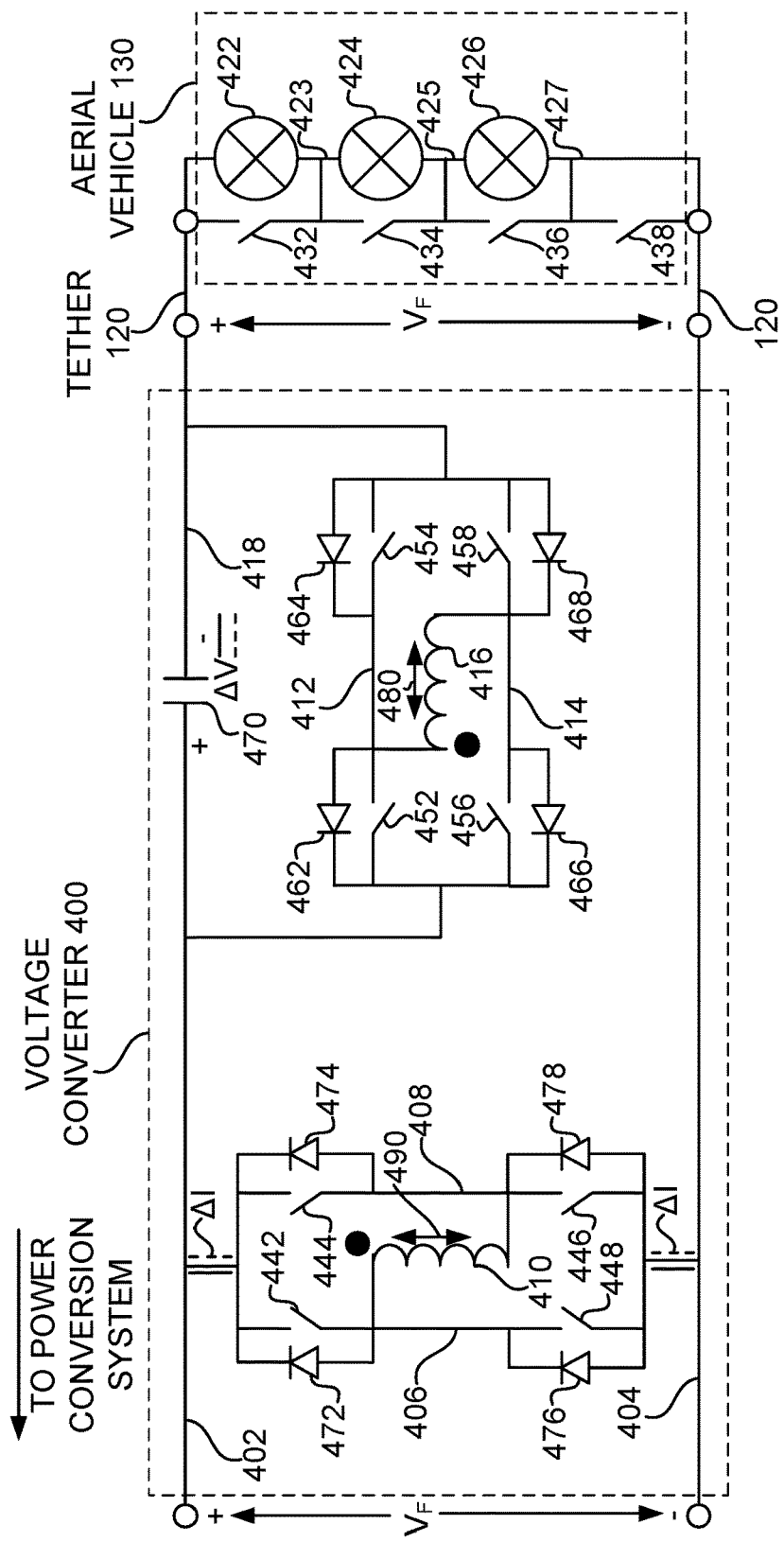
FIG. 4D depicts a voltage converter that is connected to an aerial vehicle via a tether, according to an example embodiment.

FIG. 4D also depicts the voltage converter 400 as being connected to the aerial vehicle 130 via the tether 120, according to an example embodiment. The aerial vehicle 130 is depicted in FIG. 4D as experiencing a fault on one of its motor/generators. The fault may include the motor/generator 428 experiencing a short circuit or an open circuit between the terminal 427 and the node 404. In either scenario, the switch 438 may be closed to bypass the motor/generator 428 and establish an alternative current path through the aerial vehicle 130. To illustrate this condition, the motor/generator 428 has been removed from FIG. 4D and a short circuit is shown in its place between the terminal 427 and the node 404.

FIG. 4D may further depict the voltage converter 400 as having a fault voltage (e.g., 2,550 volts DC) present (i) between the first positive node 402 and the negative node 404 and (ii) between the second positive node 418 and the negative node 404. Functionality related to this scenario will be discussed below with regard to the method 600 depicted in FIG. 6.

Figure 5:
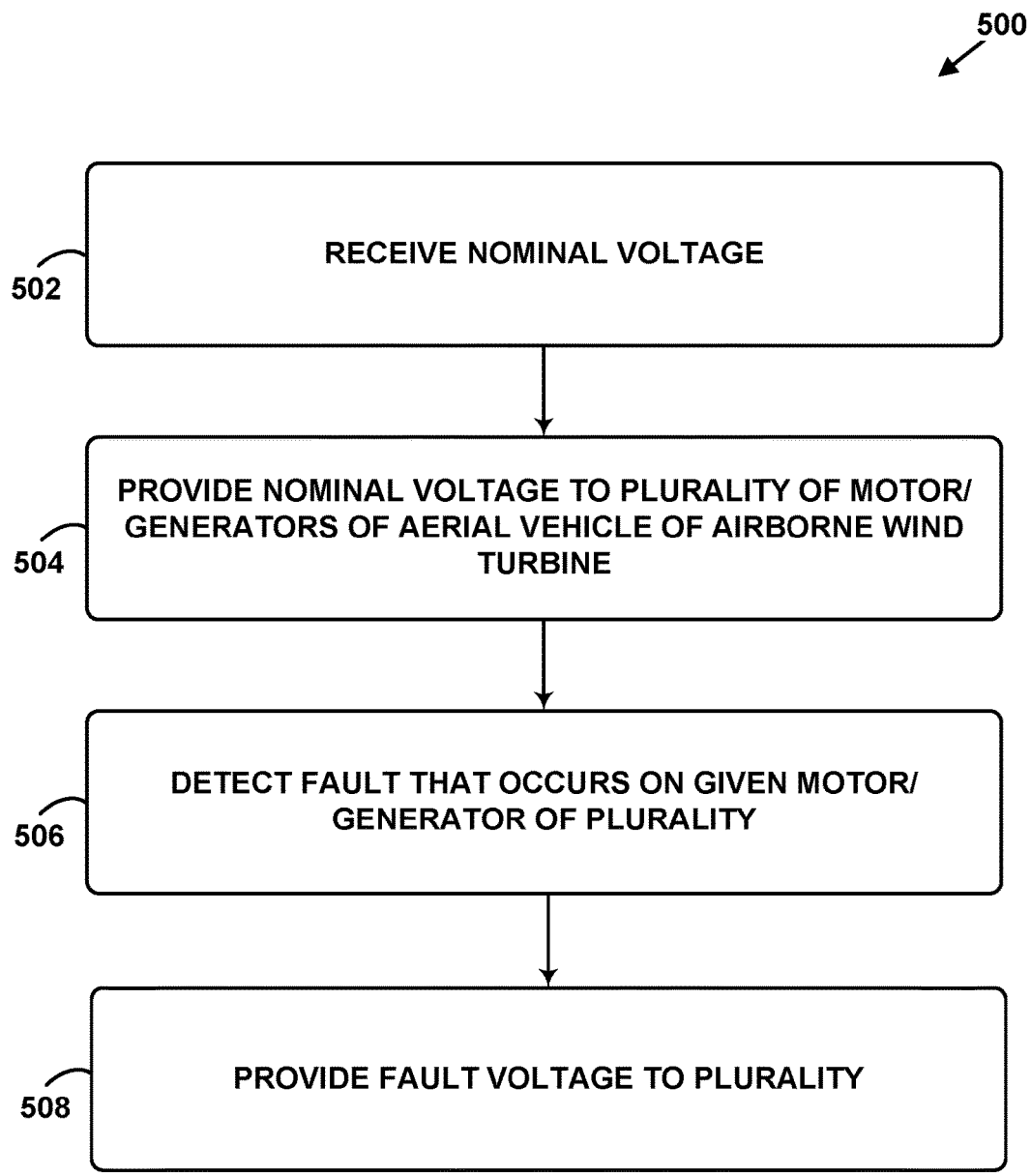
FIG. 5 is a block diagram depicting a method, according to an example embodiment.
Figure 6:
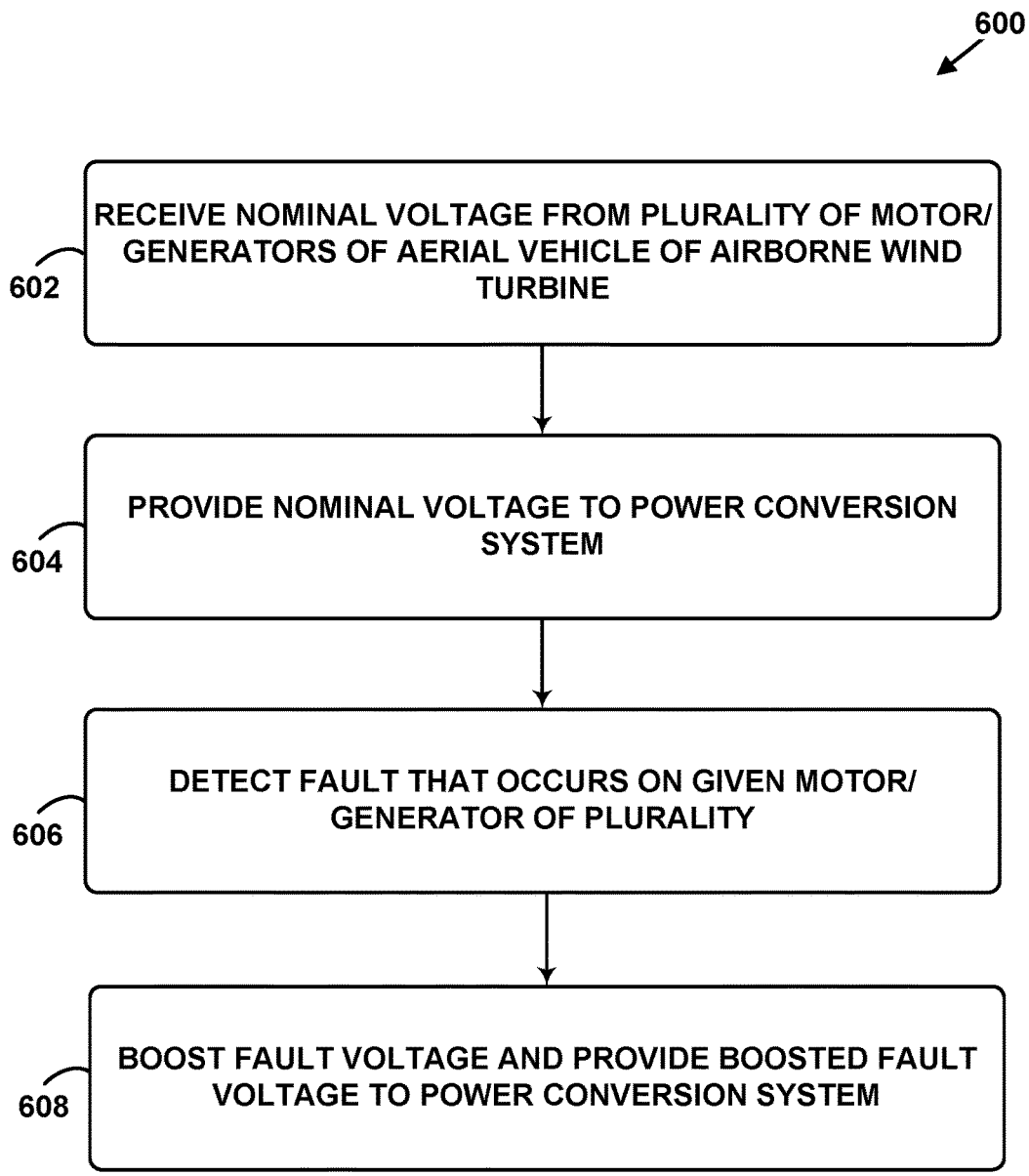
FIG. 6 is a block diagram depicting another method, according to an example embodiment.

Methods 500 and 600 respectively shown in FIG. 5 and FIG. 6, present example methods that can be performed by one or more AWT such as the AWT 100. In some examples, the methods 500 and 600 may be performed by the voltage converter 400 and processors 212 executing program instructions 216. The methods 500 and 600 may be performed by any combination of one or more suitable components described herein. FIGS. 5 and 6 may include one or more operations, functions, or actions as illustrated by one or more of blocks 502-508 and 602-608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods 500 and 600, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the methods 500 and 600, and other processes and methods disclosed herein, each block in FIGS. 5 and 6 may represent circuitry that is wired to perform the specific logical functions in the process.

FIG. 5 is a block diagram depicting the method 500, according to an example embodiment.

At block 502, the method 500 includes receiving, at a voltage converter, a nominal voltage. Referring to FIG. 4A for example, the voltage converter 400 may receive, from a power conversion system (not shown), a nominal voltage $V_N$ of about 3,400 volts DC between the positive node 402 and the negative node 404. Nominal voltages of different magnitudes and waveforms are possible as well. The nominal voltage $V_N$ received by the voltage converter 400 may be a DC voltage generated by the power conversion system that is electrically connected to an AC power grid (not shown). For example, the power conversion system may receive an AC voltage from the power grid and convert the AC voltage into the (DC) nominal voltage $V_N$ via one or more AC/DC power converters.

At block 504, the method 500 includes providing, from the voltage converter, the nominal voltage to a plurality of motor/generators of an aerial vehicle of an airborne wind turbine. The plurality of motor/generators may be electrically connected in series with a voltage drop across each individual motor/generator corresponding to a portion of the nominal voltage. For example, the voltage converter 400 may provide the nominal voltage $V_N$ between the positive node 418 and the negative node 404.

More specifically, the processor(s) 212 or the Boolean circuit may open two or more of the switches 442-448 so that, in conjunction with the rectifiers 472-478, no (positive) current can flow from the node 402 to the node 404 through the inductor 410 or via the nodes 406 and 408. Furthermore, the processor(s) 212 or the Boolean circuit may close two or more of the switches 452-458 such that a short circuit exists between the nodes 402 and 418 to bypass the inductor 416 and the capacitor 470. This may cause whatever voltage is present between the nodes 402 and 404 (in this case the nominal voltage $V_N$) to be provided between the nodes 418 and 404.

In the scenario depicted in FIG. 4A, the switches 432-438 are open, so the nominal voltage $V_N$ is divided substantially equally across the respective motor/generators 422-428 (assuming, as is the case in this example, that the motor/generators 422-428 have substantially equal impedances at their respective connection terminals). More specifically, each of the motor/generators 422-428 may see a voltage drop of $V_N/4$. In another example in which the aerial vehicle 130 includes M motor/generators that are connected in series, each of the M motor/generators may exhibit a voltage drop of $V_N/M$.

At block 506, the method 500 includes, while providing the nominal voltage, detecting a fault that occurs on a given motor/generator of the plurality of motor/generators. The fault may cause the voltage drop across each of the respective motor/generators other than the given motor/generator to increase. Referring to FIG. 4B, the motor/generator 428 (not explicitly shown in FIG. 4B) may experience a fault in which the terminal 427 is shorted to the negative node 404. For example, the motor/generator 428 may experience a short circuit fault or an open circuit fault between the terminal 427 and the node 404, and the processor(s) 212 or the Boolean circuit may close the switch 438 in response to detecting the fault. In other examples, these types of faults may occur to any of the motor/generators 422-428, and the processor(s) 212 or the Boolean circuit may respond by closing any of the corresponding switches 432-438 accordingly. It might be beneficial to close such a switch to either reestablish a current path between the nodes 418 and 404 in the case of an open circuit fault, or to bypass the faulted motor/generator in the case of a short circuit fault so as to prevent (further) damage caused to the faulted motor/generator by the short circuit fault.

Any of these kinds of faults may be detected using sensors such as voltmeters or the like. The sensors may send signals indicative of such faults to the processor(s) 212 or the Boolean circuit, which may determine that the fault has occurred based on receiving such signals. In some examples, the processor(s) 212 or the Boolean circuit may close one or more of switches 432-438 in response to detecting such faults. Voltmeters may monitor any of the nodes 402 or 404 or terminals 423, 425, or 427, for example.

A short circuit fault and/or an open circuit fault and the closing of a corresponding motor/generator bypass switch may cause the voltages across the respective motor/generators other than the faulted motor/generator to increase. Referring to FIG. 4B for example, even though a short circuit may exist between the terminal 427 and the node 404, the voltage converter 400 may still provide the nominal voltage $V_N$ to the aerial vehicle 130 between the nodes 418 and 404. This means that the voltage across each of the motor/generators 422-426 may be $V_N/3$ instead of $V_N/4$. Unchecked, this may cause damage to, or malfunctioning of, the motor/generators 422-426.

At block 508, the method 500 includes, in response to detecting the fault, providing, via the voltage converter, a fault voltage to the plurality of motor/generators. The fault voltage may have a magnitude that is less than a magnitude of the nominal voltage, thereby decreasing the voltage drops across each of the respective motor/generators other than the given motor/generator.

Referring to FIG. 4C for example, the voltage converter 400 may provide the fault voltage $V_F$ between the nodes 418 and 404 in response to detecting the fault that occurred on the motor/generator 428 (not shown explicitly in FIG. 4C). In this example, the fault voltage $V_F$ is a DC voltage of lesser magnitude than that of the nominal voltage $V_N$. More specifically, the fault voltage $V_F$ may be equal to 75% of the nominal voltage $V_N$. In an example where the aerial vehicle 130 includes M motor/generators connected in series, the fault voltage $V_F$ may be equal to $(M-1)/M$ multiplied by the nominal voltage $V_N$. Fault voltages of different magnitudes and waveforms are possible as well.

To provide the fault voltage $V_F$, the processor(s) 212 or the Boolean circuit may operate the voltage converter 400 to generate a DC voltage $\Delta V$ across the capacitor 470 via an AC current 480 through the inductor 416. For instance, the processor(s) 212 or the Boolean circuit may cycle the switches 452-458 to generate the AC current 480. Initially, the switches 452 and 458 may be closed and the switches 454 and 456 may be open, allowing the current 480 to flow from the node 402, through the switch 452 into the node 412, through the inductor 416 to the node 414, and through the switch 458 to the node 418. Next, the switches 452 and 458 may be opened and the switches 454 and 456 may be closed, allowing the current 480 to flow from the node 402, through the switch 456 into the node 414, through the inductor 416 to the node 412, and through the switch 454 to the node 418. In this way, the current 480 may flow from the node 402 through the inductor 416 to the node 418 to generate the voltage across the capacitor 470 while switching directions of travel through the inductor 416. Since the inductor 416 may be magnetically coupled to the inductor 410, the AC current 480 may induce an AC current 490 through the inductor 410. Referring to the reference frame of FIG. 4C, when the current 480 is flowing from left to right, the current 490 may flow from bottom to top, and when the current 480 is flowing from right to left, the current 490 may flow from top to bottom.

The method 500 may further include rectifying, via the one or more rectifiers 472-478, the AC current 490 to flow as a DC current from the negative node 404 to the positive node 402. In this scenario, the switches 442-448 may all be opened by the processor(s) 212 or the Boolean circuit. Referring to the reference frame of FIG. 4C for example, when the current 490 is flowing from bottom to top, the open switch 444 and the rectifier 474 prevent current from entering the node 408 from the node 402. The current 490 may flow from the node 404, through the rectifier 478, through the inductor 410, and through the rectifier 472 to the node 402. When the current 490 is flowing from top to bottom, the open switch 442 and the rectifier 472 may prevent current from entering the node 406 from the node 402. The current 490 may flow from the node 404, through the rectifier 476, through the inductor 410, and through the rectifier 474 to the node 402. In this way, the AC current 490 becomes a DC current ΔI that flows from the node 404 to the node 402.

In short, switches can be used to divert current from the node 402 to the inductor 416, thereby generating a voltage drop between the nodes 402 and 418 representing the difference between the nominal voltage $V_N$ and the fault voltage $V_F$. Mutual inductance and rectification can be used to reinsert current back into the node 402 for the sake of efficiency.

FIG. 6 is a block diagram depicting the method 600, according to an example embodiment.

At block 602, the method 600 includes receiving, at a voltage converter, a nominal voltage from a plurality of motor/generators of an aerial vehicle of an airborne wind turbine. The nominal voltage may represent a sum of voltage drop across each motor/generator of the plurality.

Referring to FIG. 4A for example, the voltage converter 400 may receive a nominal voltage $V_N$ between the nodes 418 and 404. The aerial vehicle 130 may be in power-generating mode whereby each of the motor/generators 422-428 generates a voltage of $V_N/4$. More specifically, the motor/generators 422-428 may each generate a voltage of 850 volts DC, which when combined in series, results in a nominal voltage $V_N$ of 3,400 volts DC. The motor/generators 422-428 may generate other waveforms or magnitudes of voltage in power-generating mode as well. In other examples where the aerial vehicle 130 includes M motor/generators in series, each of the motor/generators may generate a voltage of $V_N/M$.

At block 604, the method 600 includes providing, from the voltage converter, the nominal voltage to a power conversion system. For example, the voltage converter 400 may provide the nominal voltage $V_N$ between the positive node 402 and the negative node 404 that lead to a power conversion system (not shown). More specifically, the processor(s) 212 or the Boolean circuit may open two or more of the switches 442-448 so that, in conjunction with the rectifiers 472-478, no (positive) current can flow from the node 402 to the node 404 through the inductor 410 or via the nodes 406 and 408. Furthermore, the processor(s) 212 or the Boolean circuit may close two or more of the switches 452-458 such that a short circuit exists between the nodes 402 and 418 to bypass the inductor 416 and the capacitor 470. This may cause whatever voltage is present between the nodes 418 and 404 (in this case the nominal voltage $V_N$) to be provided between the nodes 402 and 404.

At block 606, the method 600 includes, while providing the nominal voltage, detecting a fault that occurs on a given motor/generator of the plurality. The fault may cause the sum of voltage drop across each of the motor/generators to decrease to a fault voltage.

Referring to FIG. 4D for example, the motor/generator 428 (not explicitly shown in FIG. 4D) may experience a fault in which the terminal 427 is shorted to the negative node 404. For example, the motor/generator 428 may experience a short circuit fault or an open circuit fault between the terminal 427 and the node 404, and the processor(s) 212 or the Boolean circuit may close the switch 438 in response to detecting the fault. In other examples, these types of faults may occur to any of the motor/generators 422-428, and the processor(s) 212 or the Boolean circuit may respond by closing any of the corresponding switches 432-438 accordingly. Any of these kinds of faults may be detected using sensors such as voltmeters or the like. The sensors, the processor(s) 212, and/or the Boolean circuit may operate to respond to the detected faults in any of the ways described above with regard to the method 500. To detect the fault, the processor(s) 212 or the Boolean circuit may receive a signal from a voltmeter monitoring the nodes 418 and 404 (and/or perhaps the terminals 423, 425, and 427). The signal may represent the voltage between the nodes 418 and 404. The processor(s) 212 or the Boolean circuit may determine that the fault on the motor/generator 428 occurred by determining that the voltage between the nodes 418 and 404 has dropped below a threshold voltage. One example of a threshold voltage might be 3,000 volts, but any voltage less than the nominal voltage may be used as a threshold voltage.

A short circuit fault and/or an open circuit fault and the closing of a corresponding motor/generator bypass switch may cause the sum of the voltages across the respective motor/generators to decrease to the fault voltage $V_F$. In turn, the voltage converter 400 may provide the fault voltage $V_F$ to the power conversion system between the nodes 402 and 404. Unchecked, this may cause damage to, or malfunctioning of, the power conversion system or other equipment making up the AWT 100.

At block 608, the method 600 includes, in response to detecting the fault, boosting the fault voltage, and providing the boosted fault voltage to the power conversion system. In some examples, the boosted fault voltage may be substantially equal to the nominal voltage.

Referring to FIG. 4C for example, the processor(s) 212 or the Boolean circuit may generate a DC voltage ΔV across the capacitor 470 by generating an AC current 490 through the inductor 410. For instance, the processor(s) 212 or the Boolean circuit may cycle the switches 442-448 to generate the AC current 490. Initially, the switches 442 and 446 may be closed and the switches 444 and 448 may be open, allowing the current 490 to flow from the node 402, through the switch 442 into the node 406, through the inductor 410 to the node 408, and through the switch 446 to the node 404. Next, the switches 442 and 446 may be opened and the switches 444 and 448 may be closed, allowing the current 490 to flow from the node 402, through the switch 444 into the node 408, through the inductor 410 to the node 406, and through the switch 448 to the node 404. In this way, the current 490 may flow from the node 402 through the inductor 410 while switching directions of travel through the inductor 410. Since the inductor 410 may be magnetically coupled to the inductor 416, the AC current 490 may induce an AC current 480 through the inductor 416. Referring to the reference frame of FIG. 4C, when the current 490 is flowing from top to bottom, the current 480 may flow from right to left, and when the current 490 is flowing from bottom to top, the current 480 may flow from left to right.

The method 600 may further include rectifying, via the one or more rectifiers 462-468, the AC current 480 to flow as a DC current from the node 418 to the node 402. In this scenario, the switches 452-458 may all be opened by the processor(s) 212 or the Boolean circuit. Referring to the reference frame of FIG. 4C for example, when the current 480 is flowing from left to right, the open switch 452 and the rectifier 462 prevent current from entering the node 412 from the node 402. The current 480 may flow from the node 418, through the rectifier 464 into the node 412, through the inductor 416 into the node 414, and through the rectifier 466 to the node 402. When the current 480 is flowing from right to left, the open switch 456 and the rectifier 466 prevent current from entering the node 414 from the node 402. The current 480 may flow from the node 418, through the rectifier 468 to the node 414, through the inductor 416 to the node 412, and through the rectifier 462 to the node 402. In this way, the AC current 480 becomes a DC current ΔI that flows from the node 418 to the node 402.

In short, switches can be used to divert current from the node 402 to the inductor 410, thereby inducing a voltage drop between the nodes 402 and 418 representing the difference between the nominal voltage $V_N$ and the fault voltage $V_F$. Mutual inductance and rectification can be used to reinsert current back into the node 402 for the sake of efficiency.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A method comprising:
   receiving, at a voltage converter, a nominal voltage;
   providing, from the voltage converter, the nominal voltage to a plurality of motor/generators of an aerial vehicle of an airborne wind turbine, wherein the plurality of motor/generators are electrically connected in series with a voltage drop across each motor/generator of the plurality corresponding to a portion of the nominal voltage;
   while providing the nominal voltage, detecting a fault that occurs on a given motor/generator of the plurality, wherein the fault causes the voltage drop across each of the respective motor/generators of the plurality other than the given motor/generator to increase; and
   in response to detecting the fault, providing, via the voltage converter, a fault voltage to the plurality of motor/generators, wherein the fault voltage has a magnitude that is less than a magnitude of the nominal voltage, thereby decreasing the voltage drops across each of the respective motor/generators other than the given motor/generator,
   wherein the voltage converter comprises a first positive node, a negative node, a second positive node, a capacitor that connects the first positive node and the second positive node, a first inductor that is connected, via one or more first switches, to the first positive node and the second positive node, and a second inductor that is connected, via one or more second switches, to the first positive node and the negative node, wherein the first inductor is magnetically coupled to the second inductor,
   wherein the plurality of motor/generators are connected to the second positive node and the negative node, and
   wherein providing the fault voltage to the plurality of motor/generators comprises providing the fault voltage between the second positive node and the negative node by:
   generating a voltage across the capacitor by generating, via the one or more first switches, a first AC current through the first inductor, thereby inducing a second AC current through the second inductor.

2. The method of claim 1, wherein decreasing the voltage drops across each of the respective motor/generators other than the given motor/generator comprises causing the voltage drops across each of the respective motor/generators other than the given motor/generator to be substantially equal to the voltage drops across each of the respective motor/generators prior to the fault.

3. The method of claim 1, wherein the nominal voltage received at the voltage converter is a DC voltage generated by a power conversion system that is electrically connected to an AC power grid.

4. The method of claim 1,
   wherein the given motor/generator comprises a first terminal and a second terminal, and
   wherein the detected fault comprises a short circuit that exists between the first terminal and the second terminal.

5. The method of claim 1,
   wherein the given motor/generator comprises a first terminal and a second terminal, and
   wherein the detected fault comprises an open circuit that exists between the first terminal and the second terminal, the functions further comprising:
   in response to detecting the fault, connecting the first terminal to the second terminal.

6. The method of claim 1, further comprising rectifying, via one or more rectifiers, the second AC current to flow as a DC current from the negative node to the first positive node.

7. A method comprising:
   receiving, at a voltage converter, a nominal voltage from a plurality of motor/generators of an aerial vehicle of an airborne wind turbine, wherein the nominal voltage represents a sum of voltage drop across the plurality of motor/generators;
   providing, from the voltage converter, the nominal voltage to a power conversion system;
   while providing the nominal voltage, detecting a fault that occurs on a given motor/generator of the plurality, wherein the fault causes the sum of voltage drop across the plurality of motor/generators to decrease to a fault voltage; and
   in response to detecting the fault, boosting the fault voltage, and providing the boosted fault voltage to the power conversion system,
   wherein the voltage converter comprises a first positive node, a negative node, a second positive node, a capacitor that connects the first positive node and the second positive node, a first inductor that is connected, via one or more first switches, to the first positive node and the negative node, and a second inductor that is connected, via one or more second switches, to the first positive node and the second positive node, wherein the first inductor is magnetically coupled to the second inductor,
   wherein the plurality of motor/generators are connected to the second positive node and the negative node, and wherein providing the boosted fault voltage to the power conversion system comprises providing the boosted fault voltage between the first positive node and the negative node by:
generating a voltage drop across the capacitor by generating, via the one or more first switches, a first AC current through the first inductor, thereby inducing a second AC current through the second inductor.

8. The method of claim 7, wherein the boosted fault voltage is substantially equal to the nominal voltage.

9. The method of claim 7, wherein the nominal voltage received at the voltage converter is a DC voltage generated by the plurality of motor/generators.

10. The method of claim 7,
wherein the given motor/generator comprises a first terminal and a second terminal, and
wherein the detected fault comprises a short circuit that exists between the first terminal and the second terminal.

11. The method of claim 7, wherein detecting the fault comprises:
detecting that the voltage converter is receiving the fault voltage from the plurality of motor/generators; and
determining that the fault voltage is less than a threshold voltage.

12. The method of claim 7,
wherein the given motor/generator comprises a first terminal and a second terminal, and
wherein the detected fault comprises an open circuit that exists between the first terminal and the second terminal, the functions further comprising:
in response to detecting the fault, connecting the first terminal to the second terminal.

13. The method of claim 7, further comprising rectifying, via one or more rectifiers, the second AC current to flow as a DC current from the second positive node to the first positive node.

14. An airborne wind turbine (AWT) comprising:
a voltage converter;
a tether, wherein the voltage converter electrically connects a power conversion system to the tether; and
an aerial vehicle comprising a plurality of motor/generators that are electrically connected in series, wherein the tether electrically connects the aerial vehicle to the voltage converter,
wherein the voltage converter is configured to operate in a first mode and a second mode,
wherein in the first mode the voltage converter receives a nominal voltage from the power conversion system and provides the nominal voltage to the plurality of motor/generators via the tether, and wherein a voltage drop across each motor/generator of the plurality corresponds to a portion of the nominal voltage, and
wherein in the second mode the voltage converter receives the nominal voltage from the power conversion system and provides a fault voltage to the plurality of motor/generators via the tether, wherein the fault voltage has a magnitude that is less than a magnitude of the nominal voltage, and wherein a voltage drop across each motor/generator of the plurality except one motor/generator corresponds to a portion of the fault voltage,
wherein the voltage converter comprises:
a first positive node and a second positive node;
a negative node;
a capacitor that connects the first positive node and the second positive node;
one or more first switches and one or more second switches;
a first inductor that is connected, via the one or more first switches, to the first positive node and the second positive node; and
a second inductor that is connected, via the one or more second switches, to the first positive node and the negative node, wherein the first inductor is magnetically coupled to the second inductor.

15. The AWT of claim 14, wherein the voltage converter is also configured to operate in a third mode and a fourth mode,
wherein in the third mode the voltage converter receives the nominal voltage from the tether and provides the nominal voltage to the power conversion system, and
wherein in the fourth mode the voltage converter receives the fault voltage from the tether, boosts the fault voltage, and provides the boosted fault voltage to the power conversion system.

16. The AWT of claim 14, wherein the voltage converter further comprises one or more rectifiers that are connected in parallel with the respective one or more first switches.

17. The AWT of claim 14, wherein the voltage converter further comprises one or more rectifiers that are connected in parallel with the respective one or more second switches.

* * * * *